Figure 1:
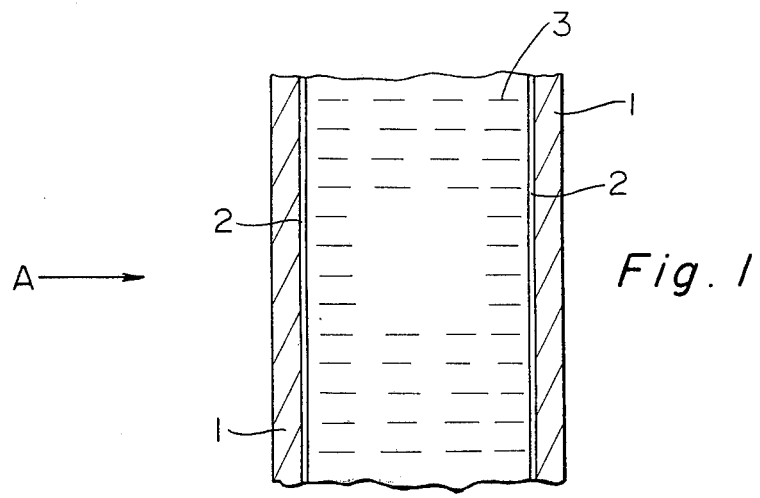

United States Patent [19]
Arai et al.

[11] 3,910,682
[45] Oct. 7, 1975

[54] LIQUID CRYSTAL CELLS

[75] Inventors: Yoshi Arai, Oyama; Shoichi Kinoshita, Omiya; Kazuo Kimura, Tokyo, all of Japan

[73] Assignees: Dainippon Ink & Chemicals Inc., Tokyo, Japan; Dainippon Ink Institute of Chemical Research, Japan

[22] Filed: July 11, 1973

[21] Appl. No.: 378,242

[30] Foreign Application Priority Data
July 15, 1972 Japan.............................. 47-70429

[52] U.S. Cl................... 350/160 LC; 117/161 UA; 117/161 UF; 117/161 UG; 117/218
[51] Int. Cl.².......................................... G02F 1/13
[58] Field of Search............350/160 LC; 117/218, 117/161 UF, 161 UA, 161 UG

[56] References Cited
UNITED STATES PATENTS

| | | | |
|---|---|---|---|
| 3,597,043 | 8/1971 | Dreyer | 350/149 |
| 3,694,053 | 9/1972 | Kahn | 350/160 LC |
| 3,728,008 | 4/1973 | Allan et al. | 350/160 LC |
| 3,803,050 | 4/1974 | Haas et al. | 350/160 LC |

*Primary Examiner*—Edward S. Bauer
*Attorney, Agent, or Firm*—Sherman & Shalloway

[57] ABSTRACT

A liquid crystal cell composed of two support plates which are arranged in parallel to each other and at least one of which is transparent, and a nematic liquid crystal substance filled between the two support plates, wherein a coating of a fluorine-containing surface active agent is formed on the opposing surfaces of the two support plates.

9 Claims, 2 Drawing Figures

LIQUID CRYSTAL CELLS

This invention relates to a liquid crystal cell.

Liquid crystal cells composed of a nematic liquid crystal and two support plates which are arranged in parallel with each other and at least one of which is transparent have been kknown. The liquid cell exhibits the phenomenon that when ultrasonic vibration or electric voltage is applied to a nematic liquid crystal layer present between two support plates, the transparent nematic liquid crystal layer becomes turbid. Investigations have been made to construct light-shielding devices, or display devices for displaying letters, symbols, figures, etc. utilizing this phenomenon.

However, in the conventional liquid crystal cells, the nematic liquid crystal layer present between the two support plates tends to become slightly turbid even in the absence of ultrasonic vibration or electric voltage since the nematic liquid crystal material is in the random state. It has been difficult to build crystal cells which do not have such a tendency, and the advent of such liquid crystal cells has been desired.

It is therefore an object of this invention to provide liquid crystal cells which meet this desire.

According to this invention, there is provided a liquid crystal cell composed of two support plates which are arranged in parallel to each other and at least one of which is transparent, and a nematic liquid crystal substance filled between the two support plates, wherein a coating of a fluorine-containing active agent is formed on the opposing surfaces of the two support plates.

The fluorine-containing surfactant used in this invention may be compounds containing a fluorocarbon group of formula $-C_nF_{2n+1}$ wherein $n$ is 5 to 10 as a hydrophobic atomic group, and as a hydrophilic atomic group, an anionic atomic group of formula $-COOM$ wherein M is a hydrogen atom, an alkali metal such as sodium or potassium or an alkaline earth metal such as magnesium or calcium, $-OSO_3M$ wherein M is the same as defined above, or $$-O\overset{O}{\underset{\|}{P}}(OH)_2,$$

a cationic atomic group of formula $-N^{\oplus}(R')_3 \cdot X^{\ominus}$ wherein R' is a lower alkyl group such as a methyl, ethyl, propyl or butyl and X is an acid group such as a halogen atom or a hydroxyl group or a carboxylic acid group of formula $R^2-COO$ wherein $R^2$ is a hydrocarbon group such as a methyl, ethyl, or phenyl group, or $-N(R^3)_2 \cdot HX$ wherein $R^3$ is a lower alkyl group such as a methyl, ethyl, propyl or butyl group and X is a halogen atom, or a non-ionic atomic group of formula $-(CH_2CH_2O-)_m H$ wherein $m$ is 5 to 25. Hydrophilic groups containing the cationic atomic groups are most preferred.

Specific examples of the fluorine-containing surfactants are compounds of the following structural formulae.

$C_nF_{2n+1}COOM$
$C_nF_{2n+1}SO_3M$ $C_nF_{2n+1}SO_2\overset{R^1}{\underset{|}{N}}CH_2COOM$

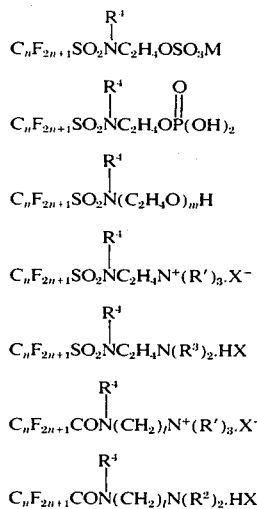

In these formulae, M, X, $R^1$, $R^3$, $n$ and $m$ are the same as defined above, $R^4$ is a hydrogen atom or a lower alkyl group such as a methyl, ethyl, propyl or butyl group, and $l$ is 1 to 5.

In the conventional liquid crystal cells intended for irradiation of ultrasonic vibration to their nematic liquid crystal layer, two transparent support plates such as glass or quartz plates are arranged in parallel to each other. On the other hand, in the conventional liquid cells intended for application of electric voltage to their nematic liquid crystal layer, two transparent plates each of which has formed on its one surface a transparent electrically conductive layer composed of tin oxide ($SnO_2$), indium oxide ($In_2O_3$), gold, silver or platinum are arranged in parallel to each other with the electrically conductive surfaces facing each other. According to the present invention, a coating of the fluorine-containing surface active agent is formed on the opposing surfaces of the two support plates in such a known liquid crystal cell. Accordingly, in liquid crystal cells of the type for application of electric voltage, a coating of the fluorine-containing surfactant is formed on the transparent electrically conductive layer which is formed on the transparent plate.

When the support plates having formed thereon a transparent electrically conductive layer are used, the conventional techniques require repeated washings of the transparent electrically conductive layers at the time of producing cells. However, when a coating of the fluorine-containing surface active agent is formed on the transparent conductive layer in accordance with this invention, such a washing step can be omitted drastically.

According to a preferred embodiment of this invention, a cell is formed by preparing a 0.0001–1.0 percent by weight aqueous solution of the fluorine-containing surface active agent, applying the resulting aqueous solution to the surfaces of support plates by such means as dipping, spraying or brush coating, drying the coating at room temperature or at an elevated temperature thereby to form a coating of the fluorine-containing surfactant on the surfaces of the support plates, arranging the two support plates in parallel to each other so that the surfaces having formed thereon the coating face each other, and then sealing the edges of the support plates leaving small apertures for filling a nematic liquid crystal substance. Alternatively, a similar cell can be built by sealing the edges of two support plates arranged in parallel to each other leaving small apertures for filling a nematic liquid crystal to form a casing, then filling an aqueous solution of the flourine-containing surface active agent into the casing, then discharging the aqueous solution, and drying the casing under heat.

A variety of nematic liquid crystal substances can be used in the present invention which include, for example, azoxy compounds such as p-azocyanisole, saturated benzol monocarboxylic acids such as p-butoxybenzoic acid, carbonates such as butyl-4-(4-ethoxyphenylcarbonyl) phenylcarbonate, and azomethine compounds such as p-alkoxybenzal-p'-butylaniline, anisidine-p-aminophenyl acetate or amyl cyanobenzal aminocinnamate. Of these, p-alkoxybenzal-p'-butylanilines expressed by the following formula

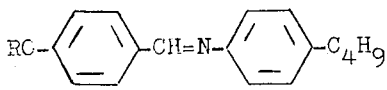

wherein R is an alkyl group of 1 to 12 carbon atoms, are suitable in the present invention since they are maintained in the nematic liquid crystal state at room temperature.

In the liquid crystal cells in accordance with this invention, it is preferred to maintain the distance between the support plates at 10 to 50 microns. When it is desired to utilize the reflecting light of the nematic liquid crystal layer as in a display device, it is possible to apply a coating to one surface of the support plates or provide a metal coating to render it non-transparent.

Figure 2:
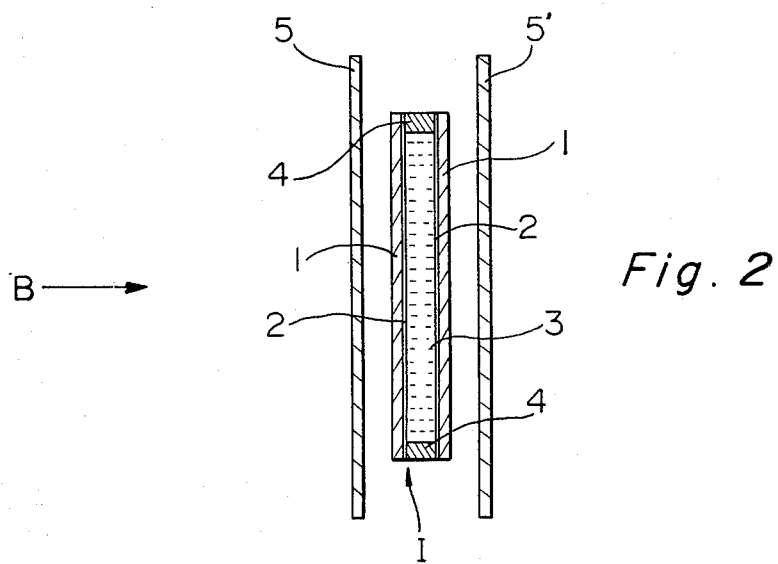

The invention will be described in the accompanying drawings in which:

FIG. 1 is a sectional view of a part of a liquid crystal cell in accordance with this invention; and FIG. 2 is a sectional view illustrating one example of using the liquid crystal cell in accordance with this invention.

In the liquid crystal cell in accordance with this invention, coatings 2,2 of a flourine-containing surfactant are formed on the opposing surfaces of the support plates 1,1 which are arranged in parallel to each other and at least one of which is transparent, as shown in FIG. 1. When a nematic liquid crystal substance 3 is filled in this cell, this substance is oriented in a direction perpendicular to the surfaces of the support plates 2,2. As a result of the liquid crystal substance being present in the oriented state and not in the random state, the liquid crystal cell exhibits a high degree of transparency when seen from the oriented direction, that is, the direction of arrow A in the drawings, and no turbidity is observed.

The "DAP effect" can be obtained by using the liquid crystal cells of this invention. This will be described with reference to FIG. 2. The DAP effect is disclosed in APPLIED PHYSICS LETTERS, Volume 19, page 391 et seq.

Referring to FIG. 2, the liquid crystal cell of this invention is shown at I. The reference numerals 1,1 represent transparent support plates each of which has formed on one surface thereof a transparent electrically conductive layer; 2,2 coatings of a fluorine-containing surface active agent formed on the transparent conductive layers of the support plates 1,1; 4,4 gaskets for sealing the two parallel support plates 1,1; and 3 a nematic liquid crystal substance. When the liquid crystal cell of this invention having the above construction is inserted between polarizer 5 and analyzer 5' facing each other with the polarization planes crossing at right angles to each other and light is irradiated to it from the direction of arrow B in the drawings, the polarized light passes through a layer of the nematic liquid crystal substance but cannot pass through the polarizer 5 and analyzer 5' because the nematic liquid crystal filled in the liquid crystal cell I is oriented in a direction perpendicular to the surfaces of the support plates 1. When at this time, a direct or alternate current voltage (usually 4–15 volts are preferred) is applied to the transparent electrically conductive layers of the liquid crystal cell I, the orientation angle of the nematic liquid crystal substance to the support plates 1,1 varies according to the voltage applied, because of the dipole moment of the nematic liquid crystal substance. Accordingly, when the light passing through the polarizer 5 passes through the nematic polarized liquid crystal layer, the polarization plane is rotated, and consequently, part of the light polarized by the polarizer 5 can pass through the analyzer 5'. By utilizing this DAP effect, it is possible to produce a display device of high contrast by the present invention. When in the above instance, white light is irradiated from the direction of arrow B while varying the voltage to be applied to the transparent electrically conductive layer, the orientation angle of the nematic liquid crystal substance to the support plates 1,1 varies from time to time, and the angle of rotation of the polarized plane changes according to the wavelength of light when the light passes through the nematic liquid crystal layer. Consequently, red to violet light rays can be taken out from the analyzer 5'.

The following Examples illustrate the present invention.

EXAMPLE 1

The eight compounds shown in Table 1 were used as the fluorine-containing surface active agent.

Table 1

| | |
|---|---|
| F-I | $C_5F_{11}SO_3K$ |
| F-II | $C_6F_{13}SO_2N(CH_3)CH_2COOK$ |
| F-III | $C_8F_{17}SO_2N(CH_3)CH_2CH_2(OCH_2CH_2)_{20}OH$ |
| F-IV | $C_8F_{17}SO_2NHCH_2CH_2N^{\oplus}(CH_3)_3 \cdot I^{\ominus}$ |
| F-V | $C_8F_{17}SO_2NHCH_2CH_2N^{\oplus}(CH_3)_3 \cdot OH^{\ominus}$ |
| F-VI |  |
| F-VII | $C_{10}F_{21}SO_2NHCH_2CH_2N^{\oplus}(CH_3)_3 \cdot Cl^{\ominus}$ |
| F-VIII | $C_7F_{15}CONHCH_2CH_2CH_2N^{\oplus}(CH_3)_3 \cdot Cl^{\ominus}$ |

A 0.1 percent by weight aqueous solution of each of the fluorine-containing surfactants was prepared, and coated on one surface each of two glass plates, followed by drying at room temperature to form a coating of the fluorine-containing surface active agent. These two glass plates were arranged in parallel to each other

EXAMPLE 2

Glass plates on one surface of which was formed a transparent electrically conductive layer composed of tin oxide, indium oxide, gold, silver or platinum were employed as support plates. A 0.5 percent by weight aqueous solution of each of the fluorine-containing surface active agents indicated was coated on the transparent conductive layer of each of the two support plates, and dried at room temperature to form a coating of the fluorine-containing surface active agent on the transparent conductive layer. Then, the two support plates were arranged in parallel to each other with the coated surfaces facing each other at an interval of 15 microns, and a cell was built in the same way as in Example 1. If desired, a nematic liquid crystal substance was filled into the cell at an elevated temperature thereby to produce a liquid crystal cell. The transparency and orientation degree of the nematic liquid crystal substance were measured. The results obtained are shown in Table 3.

Table 3

| F-containing surfactants | Transparent conductive layer | Nematic liquid crystal substances | Transparency | Degree of orientation |
|---|---|---|---|---|
| F-I | $SnO_2$ | $CH_3O$—⌬—CH=N—⌬—$C_4H_9$ | good | 0 |
|  | Au | $CH_3O$—⌬—CH=N—⌬—$C_4H_9$ | do | 0 |
| F-II | $SnO_2$ | $CH_3O$—⌬—CH=N—⌬—$C_4H_9$ | do | 0 |
| F-III | $SnO_2$ | $CH_3O$—⌬—CH=N—⌬—$C_4H_9$ (50 wt. %) |  |  |
|  | $C_2H_5O$ | —⌬—CH=N—⌬—$C_4H_9$ (50 wt. %) | do | 0 |
|  | Au | $CH_3O$—⌬—CH=N—⌬—$C_4H_9$ (50 wt. %) |  |  |
|  | $C_2H_5O$ | —⌬—CH=N—⌬—$C_4H_9$ (50 wt. %) | do | 0 |
| F-IV | $SnO_2$ | $CH_3O$—⌬—CH=N—⌬—OOC—$CH_3$ (100°C) | good | ◉ |
|  | Au | $CH_3O$—⌬—CH=N—⌬—$C_4H_9$ | do | ◉ |
|  | Ag | $CH_3O$—⌬—CH=N—⌬—$C_4H_9$ | do | ◉ |
|  | $SnO_2$ | $CH_3O$—⌬—CH=N—⌬—$C_4H_9$ (50 wt. %) |  |  |
|  | $C_2H_5O$ | —⌬—CH=N—⌬—$C_4H_9$ (50 wt. %) |  | ◉ | with the coated surfaces facing each other at an interval of 20 microns, and the edges were sealed leaving small apertures for filling a nematic liquid crystal substance. Each of the nematic liquid crystal substances shown in Table 2 was filled into the resulting cell from the small apertures. The small apertures were stopped to form a liquid crystal cell. The transparency of the cell and the degree of orientation of the nematic liquid crystal substance of the liquid crystal cell obtained were measured. The results obtained are given in Table 2.

The degree of orientation of the nematic liquid crystal substance was measured by interposing the liquid crystal cell shown in FIG. 2 between two reflecting plates whose polarization planes cross perpendicularly, and irradiating light from the direction of arrow B. In Table 2, the degree of orientation marked ◎ means that the nematic liquid crystal substance is oriented 100 percent in a direction perpendicular to the glass surfaces; in other words, since the light polarized by the polarizer 5 passes directly through the nematic liquid crystal layer, the light that has passed through the nematic liquid crystal layer is completely shielded by the analyzer 5'. The degree of orientation marked O means that the nematic liquid crystal substance is oriented about 80 percent in a direction perpendicular to the glass surfaces; in other words, the light that has passed through the nematic liquid crystal layer slightly passes through the analyzer 5' as a result of the fact that when the light polarized at the polarizer 5 passes through the nematic liquid crystal layer, the polarization plane is rotated.

Table 2

| F-Containing surfactants | Nematic liquid crystal substances | Transparency | Degree of orientation |
|---|---|---|---|
| F-I | $CH_3O$—⟨phenyl⟩—CH=N—⟨phenyl⟩—$C_4H_9$ | good | 0 |
| F-II | $CH_3O$—⟨phenyl⟩—CH=N—⟨phenyl⟩—$C_4H_9$ | do | ◎ |
| F-III | $CH_3O$—⟨phenyl⟩—CH=N—⟨phenyl⟩—$C_4H_9$ (50% by weight) | | |
| | $C_2H_5O$—⟨phenyl⟩—CH=N—⟨phenyl⟩—$C_4H_9$ (50% by weight) | do | 0 |
| F-IV | $CH_3O$—⟨phenyl⟩—CH=N—⟨phenyl⟩—$C_4H_9$ | do | ◎ |
| F-V | $CH_3O$—⟨phenyl⟩—CH=N—⟨phenyl⟩—$C_4H_9$ | do | ◎ |
| F-VI | $CH_3O$—⟨phenyl⟩—CH=N—⟨phenyl⟩—$C_4H_9$ (50% by weight) | | |
| | $C_2H_5O$—⟨phenyl⟩—CH=N—⟨phenyl⟩—$C_4H_9$ (50% by weight) | do | ◎ |
| F-VII | $CH_3O$—⟨phenyl⟩—CH=N—⟨phenyl⟩—$C_4H_9$ | good | ◎ |
| F-VIII | $CH_3O$—⟨phenyl⟩—CH=N—⟨phenyl⟩—$C_4H_9$ | do | ◎ |

Table 3 — Continued

| F-containing surfactants | Transparent conductive layer | Nematic liquid crystal substances | | Transparency | Degree of orientation |
|---|---|---|---|---|---|
| | Pt | CH$_3$O | ⟨C$_6$H$_4$⟩—CH=N—⟨C$_6$H$_4$⟩—C$_4$H$_9$ (50 wt. %) | | |
| | | C$_2$H$_5$O | ⟨C$_6$H$_4$⟩—CH=N—⟨C$_6$H$_4$⟩—C$_4$H$_9$ (50 wt. %) | | ◎ |
| F-V | SnO$_2$ | CH$_3$O | ⟨C$_6$H$_4$⟩—CH=N—⟨C$_6$H$_4$⟩—C$_4$H$_9$ | do | ◎ |
| | In$_2$O$_3$ | CH$_3$O | ⟨C$_6$H$_4$⟩—CH=N—⟨C$_6$H$_4$⟩—C$_4$H$_9$ | do | ◎ |
| F-VI | SnO$_2$ | CH$_3$O | ⟨C$_6$H$_4$⟩—CH=N—⟨C$_6$H$_4$⟩—C$_4$H$_9$ | good | ◎ |
| | Au | CH$_3$O | ⟨C$_6$H$_4$⟩—CH=N—⟨C$_6$H$_4$⟩—C$_4$H$_9$ (32 wt. %) | | |
| | | C$_2$H$_5$O | ⟨C$_6$H$_4$⟩—CH=N—⟨C$_6$H$_4$⟩—C$_4$H$_9$ (36 wt. %) | | |
| | | C$_4$H$_9$O | ⟨C$_6$H$_4$⟩—CH=N—⟨C$_6$H$_4$⟩—C$_4$H$_9$ (22 wt. %) | do | ◎ |
| | | C$_{12}$H$_{25}$O | ⟨C$_6$H$_4$⟩—CH=N—⟨C$_6$H$_4$⟩—C$_4$H$_9$ (10 wt. %) | | |
| F-VII | SnO$_2$ | CH$_3$O | ⟨C$_6$H$_4$⟩—CH=N—⟨C$_6$H$_4$⟩—C$_4$H$_9$ | do | ◎ |
| F-VIII | SnO$_2$ | CH$_3$O | ⟨C$_6$H$_4$⟩—CH=N—⟨C$_6$H$_4$⟩—C$_4$H$_9$ | do | ◎ |

When a 15-volt direct current voltage was applied to the transparent conductive layer of the liquid crystal cells obtained in this Example, the transparent nematic liquid crystal layer became turbid.

When each of these liquid crystal cells was inserted between polarizer 5 and analyzer 5' with their polarization plane being perpendicular to each other, and a 5–8 volt direct current voltage was supplied to the transparent conductive layer and at the same time, solar rays were irradiated on it from the direction of arrow B, red to violet rays could be taken out from the analyzer 5'.

What is claimed is:

1. In a liquid crystal cell composed of two support plates which are arranged in parallel to each other and at least one of which is transparent, and a nematic liquid crystal substance filled between said two support plates; the improvement wherein a coating of a fluorine-containing surface active agent is formed on the opposing surfaces of the two support plates wherein said fluorine-containing surface active agent is a compound having a fluoro-carbon group of formula —C$_n$F$_{2n+1}$ wherein $n$ is 5 to 10 as a hydrophobic atom group and a cationic atom group selected from the group consisting of —N$^+$(R$^1$)$_3$·X$^-$ wherein R$^1$ is a lower alkyl group and X is an acid group as a hydrophilic atomic group and $-N(R^3)_2 \cdot HX$ wherein $R^3$ is a lower alkyl group and X is a halogen atom as a hydrophilic atomic group.

2. The liquid crystal cell of claim 1 wherein said two support plates are transparent glass plates.

3. The liquid crystal cell of claim 1 wherein said two suppport plates are transparent glass plates having formed on their one surface a transparent electrically conductive layer, and are arranged such that the transparent conductive layers face each other.

4. The liquid crystal cell of claim 3 wherein said transparent electrically conductive layer is a layer of tin oxide ($SnO_2$) or indium oxide ($In_2O_3$).

5. The liquid crystal cell of claim 1 wherein said fluorine-containing surface active agent is a compound of the formula

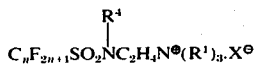

wherein $n$ is 5 to 10, $R^1$ is a lower alkyl group, X is an acid group, and $R^4$ is a hydrogen atom or a lower alkyl group.

6. The liquid crystal cell of claim 1 wherein said fluorine-containing surface active agent is a compound of the structural formula

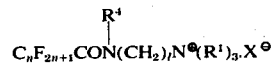

wherein $n$ is 5 to 10, $R^1$ is a lower alkyl group, X is an acid group, $R^4$ is a hydrogen atom or a lower alkyl group, and $l$ is 1 to 5.

7. The liquid crystal cell of claim 1 wherein said fluorine-containing surface active agent is a compound expressed by the formula

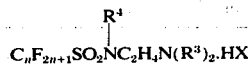

wherein $n$ is 5 to 10, $R^3$ is a lower alkyl group, X is a halogen atom, and $R^4$ is a lower alkyl group.

8. The liquid crystal cell of claim 1 wherein said fluorine-containing surface active agent is a compound expressed by the formula

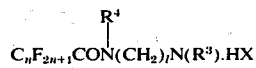

wherein $n$ is 5 to 10, $R^3$ is a lower alkyl group, X is a halogen atom, $R^4$ is a hydrogen atom or a lower alkyl group, and $l$ is 1 to 5.

9. The liquid crystal cell of claim 1 wherein said nematic liquid crystal substance is a p-alkoxybenzal-p'-butyl-aniline of the formula

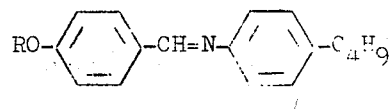

wherein R is an alkyl group containing 1 to 12 carbon atoms.

* * * * *